United States Patent Office 3,551,059
Patented Dec. 29, 1970

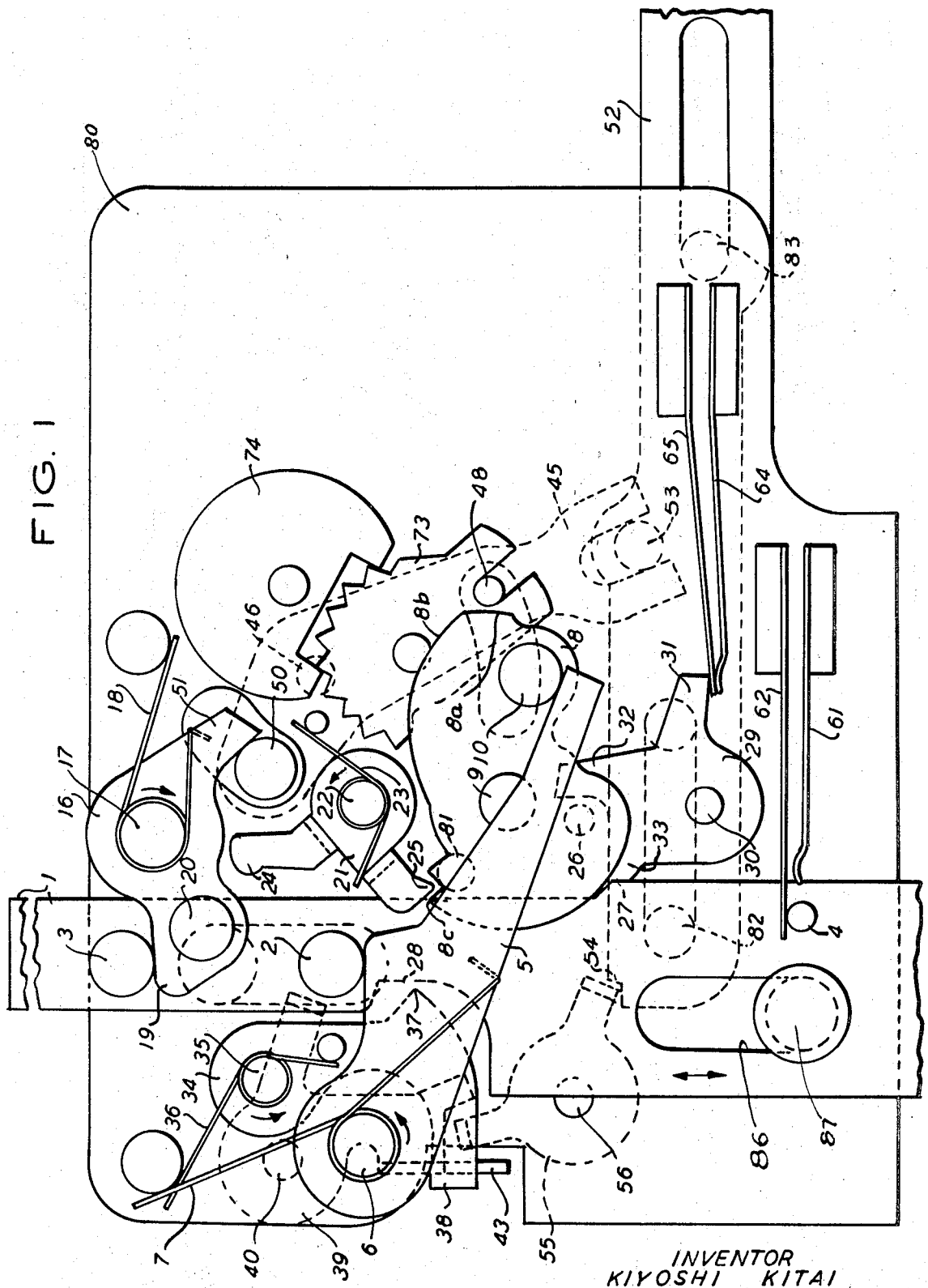

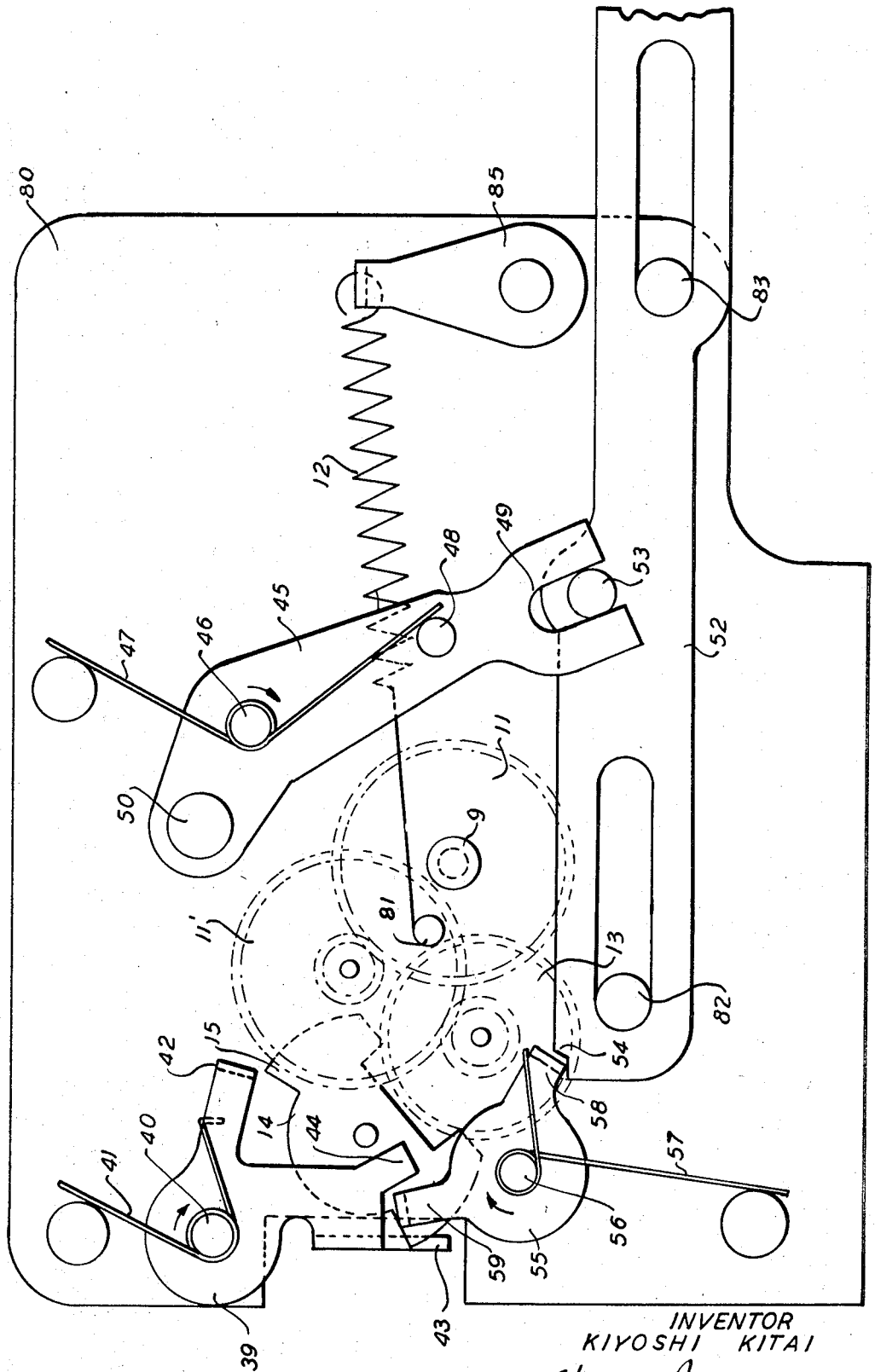

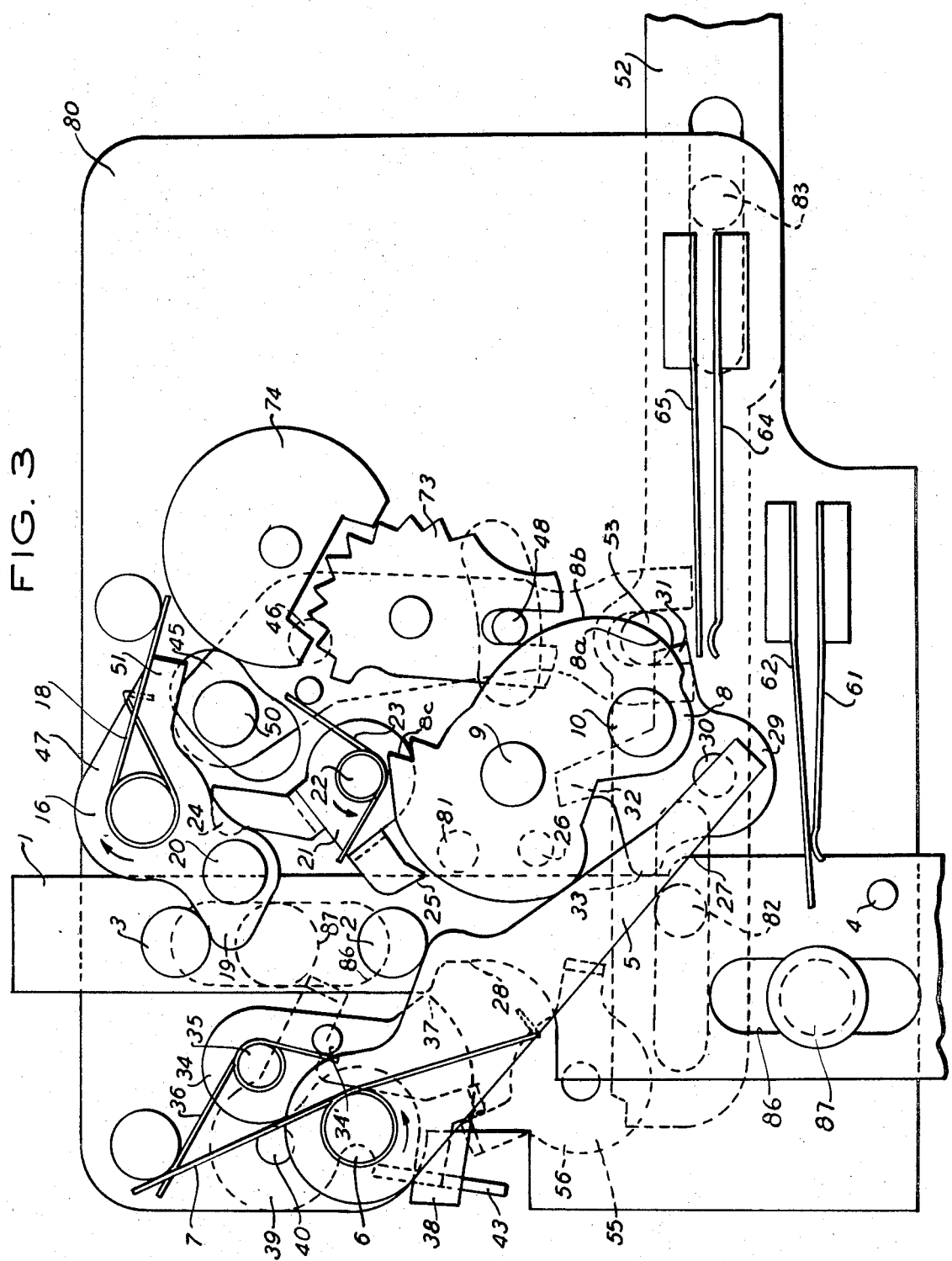

3,551,059
BRIGHTNESS OR LIGHT INTENSITY DETECTING DEVICE
Kyoshi Kitai, Tokyo, Japan, assignor to Kabushiki Kaisha Hattori Tokeiten
Filed Apr. 7, 1967, Ser. No. 629,234
Claims priority, application Japan, Apr. 9, 1966, 41/22,102
Int. Cl. G01j 1/52; G03b 9/00
U.S. Cl. 356—226                                6 Claims

ABSTRACT OF THE DISCLOSURE

The invention relates to a device for sensing light intensity and effectuating electrical and/or mechanical movement in direct ratio to the brightness or intensity of light, to move, for example, an exposure control lever for a camera, according to the degree of brightness or light intensity.

BRIGHTNESS OR LIGHT INTENSITY DETECTING DEVICE

Figure 4:
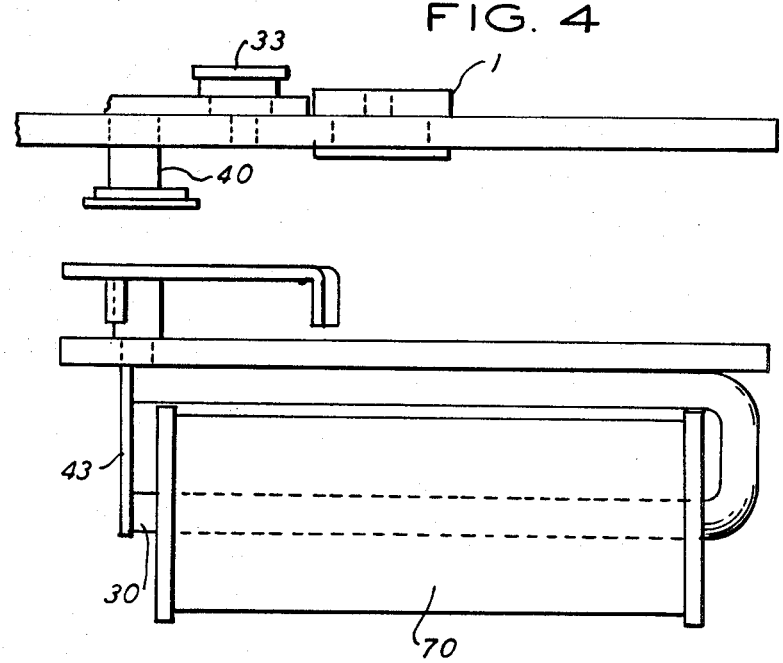

This invention relates to a light-motion detecting and translating device providing means automatically effectuating electrical and/or mechanical movement in accordance with the brightness or light intensity sensed by the device. The invention is adapted for use as a control means to electrically or mechanically automatically actuate or move a member in linear or other directions, for example, for moving an exposure control lever for a camera lens, in accordance with brightness or light intensity.

Pursuant to the invention, the light mechanism is initially locked against actuation until release by the user, for example, on pushing a release plate or button.

In the drawings and description below, application of the invention has been exemplified in connection with a lever or control member for a camera. It will be apparent form the disclosure herein that the invention may be used to control actuation of any other mechanical or electrical mechanism in direct relation to the brightness or value of light.

The drawings, illustrating procedures and devices useful in carrying out the invention, and the description below, are exemplary only of the invention.

Figure 5:
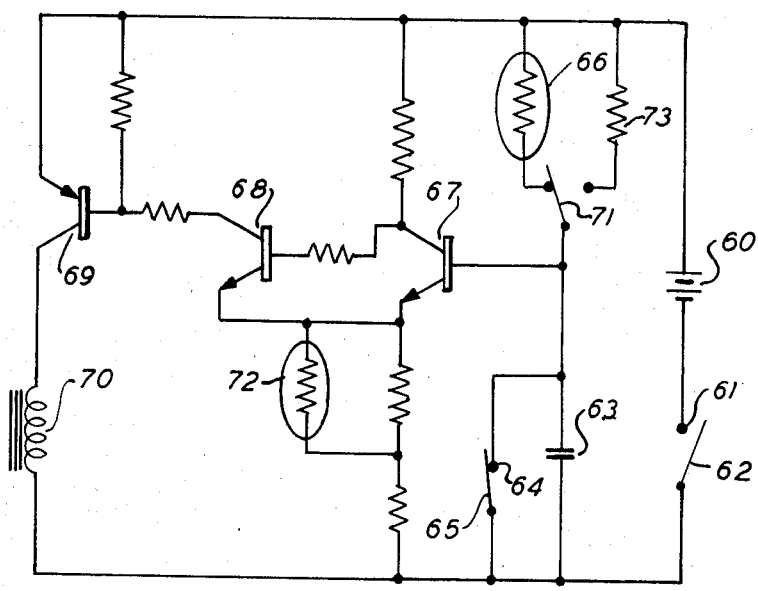

In the drawings, wherein similar reference characters indicate like parts:

FIG. 1 is a top plan view of a device embodying the invention, the parts being shown essentially in their inoperative position, FIG. 2 is a plan view at a lower plane thereof, FIG. 3 is a further top plan view showing the device operated responsive to the brightness of light sensed, FIG. 4 is a side elevational view of an electromagnet and associated parts which may be used in connection with the device, and FIG. 5 is a wiring diagram of a circuit which may be used in accordance with the invention.

As shown in the drawings, the device may include a base plate 80 on which parts, as below described, may be mounted, arrows indicating normal directions of rotation of associated parts, usually responsive to spring means indicated.

In accordance with the invention, a release plate 1, which may be a push button or lever to be depressed by the operator, is shown mounted on base plate 80 as, for example, by a pin and slot arrangement (86, 87, FIG. 1), said plate 1 being provided with upstanding pins 3, 2 and 4. Upstanding pin 2 normally serves as a stop against which lever 5 (FIG. 1) abuts; said lever is pivotally mounted on pin 6 on the base plate 80 and normally urged by spring 7 or other means counterclockwise into engagement with pin 2. The free end of the lever is thereby normally urged against pin 10 of cam plate 8 holding it in the inoperative "up" position of FIG. 1. Pin 9 is rotatably journalled in plate 80 and has cam 8 keyed to one end (FIG. 1) thereof for rotation therewith on one side of plate 80; gear 11 is keyed to the other end thereof at the other face of plate 80. Cam plate 8 has cams 8a, 8b, locking notch 8c, and a pin 26 depending from the underside. Cam 8 is normally urged clockwise with gear 11 (through pin 81, FIG. 2), said gear being urged clockwise by spring 12 which may have the free end thereof secured to a lever or anchor 85 fixed to base plate 80, as by being bolted thereto or adjustably secured thereto to enable tension of the spring to be adjusted. An interlocking lever 45 is provided through pin 48 engaging the cam surfaces 8a, 8b of cam 8 (FIGS. 3, 1) and pin 53 (FIGS. 2, 3) engaging the lever 52, for interlocking cam 8 with the exposure control lever 52. Exposure control lever 52 in turn may be axially reciprocably mounted on the base plate 80 by a pin and slot arrangement, as indicated at 82, 83 (FIGS. 1, 2 and 3).

The interlocking lever 45 is (FIG. 2) normally urged clockwise by spring 47, and pin 48 thereof is adapted to abut the cam surfaces 8a, 8b. The position of cam 8, on rotation thereof, responsive to actuation of the device in accordance with the brightness or value of light intensity sensed by the device (as below described) thus determines the extent to which the cam will rotate and therefore determines the extent to which the cam will rotate, and therefore determines the position of cam surfaces 8a, 8b, and pin 48, thus correspondingly moving the interlocking lever 45. Thus, in turn, lever 52 is moved to the left (viewing the parts as shown in FIGS. 2 and 3). Corresponding mechanical movement of any parts such as camera exposure controlling means secured to or actuated by movement of lever 52, is attained.

A pin 26, fixed to the underside of cam 8, limits rotation of the bell crank 29 (for closing switch 64, 65, FIG. 1). Thus, when the device is not actuated and the parts are in normal (FIG. 1) position, the arm 31 of the bell crank will close the switch 65, 64, as below described. In the FIG. 1 position downwardly flanged arm 38 of operating lever 34 which is rotatably mounted on pin 35 (FIG. 1) presses counterclockwise against the upwardly bent end of arm 43 of anchor locking member 39 and the latter is thus held against the (clockwise urging) tension of its spring 41 (FIG. 2). Arm 42 of locking member 39 is "up" in FIG. 2, clear of anchor 14 of the cam 8 actuating gear train 11, 11', 13 but the gear train and thus the cam 8 and lever 52 are prevented from operating by virtue of the (FIG. 1) normal position of cam locking member 21, a pivotally mounted bell crank, one of whose arms (25) is then engaged within the recess 8c of cam 8, preventing rotation of the cam. The operating lever 34 is permitted to rotate to its FIG. 1 (counterclockwise) position to dispose the parts as above outlined intially while the nosing 37 of operating lever 34 is thus disposed in recess 28 of operating lever. However, that condition ceases when the operating lever 1 is depressed, moving the recess 28 past the nosing 37 of the operating lever 34; on engagement of the edge surface of lever 1 with nosing 37, the operating lever 34 is thus rotated (clockwise) against the tension of its spring 36 (FIG. 3). Now the anchor locking member 39 is free (of 34) and so may rotate responsive to its spring (clockwise) and into locking engagement with escapement lever 14 (not shown) and it is in that position (FIG. 3). The anchor locking member 39 will, however, be rotated (counterclockwise) against the tension of its own spring and thus to the (FIG. 2) position clear of the anchor member 14 during such time as the electromagnet 70 is energized. Member 70 which may be a solenoid or other electromagnetic member, arranged so as to hold the anchor locking member 39 against tension of spring 41, to hold end 42 of member 39 free of the anchor 14 so that the gear train may be actuated by spring 12. To achieve such position of the anchor locking member 39 the latter must as just noted be rotated (counterclockwise to the FIG. 2 position) contary to its tendency to rotate (clockwise FIG. 3) due to its spring (41) action. FIG. 5 illustrates an exemplary circuit for use in connection with the invention; it will be understood that variations in the circuit and in the mechanisms herein disclosed may be made.

The electromagnet 70 is so located relative to end 43 of anchor locking member 39 as to exert electromagnetic attraction on the anchor locking member 14—for the purpose above mentioned.

As above noted, anchor locking member 39 (FIG. 1) is free to rotate clockwise but is restrained from such clockwise rotation by the operating lever 34, which tends to rotate counterclockwise initially (FIG. 1) with the downturned end of arm 38 of the operating lever 34 serving as a stop which prevents the clockwise rotation of the anchor locking member 39. This condition continues as long as the parts are so registered as shown in FIG. 1, with the nosing projection 37 of the operating lever 34 positioned in the cam recess 28 of the release plate 1. As above noted, when the release plate is depressed (FIG. 3) so that the nosing projection 37 of lever 34 is displaced from the recess 28, the operating lever 34 is rotated to the position shown FIG. 3, against the tension of its spring 36. The anchor locking member 39 then rotates clockwise responsive to its spring 41 (FIG. 3) and will be disposed in that position until solenoid 70 electromagnetically attracts the arm 43 of the anchor locking member 39, thereby the anchor locking member 39 will be rotated counterclockwise to dispose the arm 42 thereof out of the nosing projection 15 of escapement lever 14 (FIG. 2), the parts remaining in that position and permitting the gear train to be actuated responsive to spring 12 and to thereupon rotate cam 8 so as to present cam surfaces 8a, 8b in camming relationship with pin 48 of lever 45 during such time as the electromagnet or armature is so energized. Determination of such energization period may be as below described.

When the arm 43 of anchor locking member 39 is no longer electrically magnetically attracted to armature 70, it rotates clockwise (responsive to its spring 41, FIG. 3).

As above noted, when lever 1 is depressed (FIG. 3) the actuation of the electromagnet 70 (during the period determined through the circuit FIG. 5), draws the anchor locking member 39 counterclockwise and holds the arm 42 thereof (FIG. 2) out of the nosing projection 15 of escapement lever 14. When solenoid 70 is no longer energized, member 39 rotates clockwise locking escapement lever 14 and the gear train against movement.

The FIG. 1 position is an initial inoperative one. Anchor locking member 39 is disengaged from escapement lever nosing or projection 15. The FIG. 2 position continues while electromagnetic 70 is energized, rotating the anchor locking member 39 counterclockwise (contrary to its spring 41). In FIG. 3 lever anchor locking member 39 has been pushed, anchor locking member 39 has rotated and arm 42 thereof interlocked with the nosing projection 15, locking the gear train and preventing rotation of the cam 8 and thereby terminating the movement of the controlling lever 52.

In the initial inoperative position of the parts (FIG. 1) pin 4 release plate 1 holds movable contact 62 of power source switch 61–62 open (FIG. 5 position) (said switch being a normally closed switch) to open the electric circuit. When the release plate 1 is pushed down, switch 61–62 assumes its normally closed position (FIG. 3).

Along the right hand edge of release plate 1 (in the position of the parts shown in FIG. 1) there is provided a cam surface 27 for engaging nosing 33 of contact actuating bell crank or lever 29. The latter rotates on pin 30 on the base plate and is provided with two arms 31, 32 in addition to the cam engagement nosing 33. Arm 31 normally (FIG. 1) presses movable contact 65 of a second switch into engagement with contact 64 thereof when the nosing 33 engages the cam edges 27 of the plate 1, in the original (inoperative) position of the parts. When the release plate 1 is pushed downwardly (FIG. 3) the cam nosing 27 is moved past the nosing 33 of the bell crank, allowing switch 65 to return to its (normally open) position, bell crank 29 being prevented from excess movement by the stop pin 26.

Plate 21 is rotatably mounted in the device on a pivot pin 22 and urged, as by spring 23, counterclockwise; thus, normally (FIG. 1) the nosing 25 thereof registers with notch or keyway 8c of the cam plate to thereby hold the same against displacement, until rotation of the gear 11. The latter is (FIG. 2) coupled in a gear train having a second gear 11′, an escape gear 13 and an escapement wheel or anchor 14, having nosing or projection 15 which, when engaged by the downwardly flanged end 42 of anchor locking member 39, locks the gear train against rotation.

The bell crank restoring lever 16 (FIG. 1) is pivotally mounted on pivot pin 17 and normally urged by spring 18 clockwise to dispose the end or projection 19 thereof into engagement with pin 3 on release plate 1, thereby holding the release plate in its normal (FIG. 1) position. Said lever 16 is provided with an opposite arm or end 51 normally urged into engagement with pin 50 on the interlocking lever 45, to hold t he latter at its inoperative FIG. 1) position. On movement of the lever 1 downwardly, the pin 3 will engage the lever 16 and rotate the latter (counterclockwise) and thereby pin 20 (extending to the underside thereof) will be engaged with the arm 24 of the cam locking plate 21, rotating the latter, withdrawing nosing 25 from locking notch 8c of cam 8. The release plate 1 carries, at its lower end, a pin 4 which normally supports contact 62 and thereby opens the normally closed power switch 61–62.

Another arm, 44 (FIG. 2) of anchor locking member 39 engages arm 59 of locking lever 55 which locks controlling lever 52, said locking lever 55 being rotatably mounted, as at 56, and normally urged clockwise, as by spring 57 (FIG. 2) so that the end 58 thereof will engage recessed portion or notch 54 at the end of exposure controlling lever 52 to thereby lock the latter against movement as below further described.

Interlocking lever 45, which interlocks cam 8 and exposure control lever 52, is provided with a pin 50 adapted to be engaged by the arm or projection 51 of restroing lever 16, which is rotatably mounted as at 17 and is urged clockwise by spring 18, to thereby (through projection 19 engaging lever pin 3) urge interlocking lever 45 to the position shown in FIG. 1, at which the exposure control lever 52 is held at its initial (inoperative) position—the right-hand position of FIG. 1 and the locking lever 55 is held against clockwise rotation and displacement by the position of member 34 holding member 39.

There is also rotatably mounted on the base plate a buffer gang wheel 73 (FIGS. 1 and 3) provided with a slotted end engaging pin 48 of interlocking lever 45, said buffer wheel being thus disposed interconnecting relationship between the interlocking lever 45 and rotatably mounted anchor 74.

In FIG. 5 a circuit arrangement which may be used in connection with the invention is illustrated. There is shown a battery or other power source 60 in series circuit with power switch 61–62. The movable contact 62 of said switch, as above described, is engaged by pin 4 of release plate 1 and normally (FIG. 1) thus held open, in the initial position of the parts. There is also provided a starting switch 64–65 in parallel with condenser 63 of the capacitor-resistor circuit, which consists of condenser 63 and a photo-conductive element-for example, a cadmium sulfide cell 66. Movable contact 65 of the starting switch is released to normally open position (FIG. 3) by arm 31 of the contact actuating lever 29 on depressing lever 1. A control circuit comprises transistors 67, 68, 69, and a solenoid or other electrical or electromagnet device 70 and resistances. A selector switch 71 is provided for connection selectively with the cadmium sulfide cell 66 or fixed resistance 73, for checking the power sufficiency of battery 60. A thermister 72 is provided for correction of temperature.

OPERATION OF THE DEVICE

The detecting member of this invention comprises the interlocking lever 5, which, through pin 48, traces cam surfaces 8, 8b of the cam 8, and thereby translates rotary motion of the cam, effectuated when lever 1 is depressed by the operator, disconnecting the lever 5 from pin 10 of cam 8.

Initially the parts are positioned as shown in FIG. 1, power switch 61–62 being open (minimizing power drain) and the starting switch 64–65 closed. When plate 1 is pushed down by the operator, pin 2 rotates cam holding lever 5 clockwise against the tension of spring 7 but the cam plate remains at that moment engaged by nosing 25 of cam locking member 21. Pin 4, moving downwardly with the plate 1, permits the power switch 61–62 to achieve closed (FIG. 3) position; current thereupon flows through the electric control circuit including photoconductive element 66 as above described from the source 60.

While the starting switch 64–65 at this time (FIG. 1) is closed, the condenser 63 is not charged electrically and therefore the transistor 69 of the electronic control circuit becomes conductive to energize the electromagnet 70. An electomagnetic field is thus set up to attract the anchor locking member 39 which, on downward moveward movement of lever 1, is freed from the restraining influence of lever 34. With downward movement of release plate 1, nosing 37 of the operating lever 34 engages the edge of the release plate 1 above the lever recess 28, causing operating lever 34 to be rotated clockwise (against the tension of its spring 36).

Pin 3 of lever 1 (on downward movement of lever 1) rotates restoring lever 16 counterclockwise (contrary to the urging of its spring 18) and thereby the pin 20 of restoring lever 16 engages arm 24 of cam locking member 21 and rotates the latter clockwise (contrary to its spring) to withdraw nosing 25 thereof clear of the registration recess 8c of cam 8, which then starts to rotate clockwise with the (FIG. 2) gear train 11, 11', and 13. On rotation of cam 8, the contact actuating lever 29 is simultaneously free of pin 26, which moves with the cam away from end 32 of the contact actuating lever 29 and the contact 65 of the switch moves to its (normally open, FIG. 3) position, opening the switch and thereby the condenser 63 of the capacitor resistor circuit starts to charge electricity in accordance with the variation of the resistance of photoconductive element 66. The cam plate 8 continues rotation while the interlocking lever 45 is being restrained by the continued interengagement of the exposure control lever 52 with its restraining member 55. Thus, when condenser 63 reaches a normal value or voltage charge for appropriately biasing the base of transistor 67, current flows to transistor 67 cutting current flow through transistor 69; the magnet 70 is then no longer energized sufficiently to hold anchor locking member 39 against rotation; the latter then rotates clockwise responsive to its spring 41 and the arm 42 thereof engages nosing projection 15 of escapement lever 14, locking the latter and thereby determining the amount of rotation of cam plate 8 in response to the current flowing through photoconductive element 66 when the charged voltage of the condenser 63 returns to normal. Thus light-to-motion control is effectuated by the light incident on photoconductive element 66 determining time and extent of motion.

On rotation of anchor locking member 39 free of the restraining influence of the electromagnet 70, arm 44 thereof engages arm 59 of restraining lever 55, rotating the latter (against tension of its spring 57) and thus lifting arm 58 of lever 55 out of the notch 54 of exposure control lever 52, enabling the latter to be moved to the left (as shown in the drawings) by the interlocking lever 45 (responsive to its spring 47, FIG. 2), to the degree permitted by the extent of rotation of cam 8 and lever 55 and thus of disposition of its cam surface engaged by pin 48 of interlocking lever 45 (FIG. 3).

The extent of movement of interlocking pin 48—the cam sensing pin—and, thereby, movement of the exposure control lever 52, is determined by the value, brightness or intensity of light sensed by photoconductive element 66. By thus controlling the exposure control member of the shutter diaphragm of the camera or the shutter the desired exposure may be obtained automatically and accurately. At this moment operation of the shutter may be begun.

While exposure control lever 52 and interlocking lever 45 thus move to the left buffer escape gang wheel 73 (FIG. 3) and buffer anchor 74 which limit the movement of lever 45 are actuated through pin 48 of interlocking lever 45.

Restoration from the completed operation (FIG. 3) to the initial (FIG. 1) condition of the parts is achieved as follows: Release plate 1, no longer depressed by the operator, moves upwardly responsive to springs 7 of set lever 5 and 18 of restoring lever 16, parts 5 and 16 being thus rotated into interengagement with pins 2 and 3 of lever 1 and urging the latter upwardly. When the release plate 1 so rises, and its recess 28 registers (FIG. 1) with projection 37 of operating lever 34, the latter is thereby enabled to rotate (counterclockwsie, responsive to spring 36), flanged end 38 of operating lever 34 engaging flanged arm 43 of anchor locking member 39, rotating the latter counterclockwise therewith (against tension of spring 41 of lever 39), rotating arm 42 of anchor locking member 39 out of enagegement with projection 15 of anchor 14 and freeing the gear train.

Cam plate 8 rotates with rotation (counterclockwise) of set lever 5 (when pin 2 moves upwardly with upward movement of lever 1), stressing gear train spring 12. Simultaneously the restoring lever 16 rotates (responsive to its spring 18) projection 51 of lever 16 and exerts force on pin 50 at the upper end of interlocking lever 45, thereby (through its pin 53 engaging exposure control lever 52) moving the latter to the right in the position of the parts shown in the drawings; restraining lever 55 rotates clockwise (spring 57) disposing its arms or end 58 into registration with end notch 54 of exposure control lever 52. Cam plate 8 further rotates; pivot pin 26, fixed to the underside of cam plate 8, approaches the projection or arm 32 of the contact actuating lever 29 before projection or nosing 33 has been rotated by the cam surface 27 of release plate 1, bell crank 29 having rotated slightly (clockwise), closes (FIG. 1) the starting switch 65–64, arm 32 being out of the restoring course of rotation of cam pin 26.

During the last portion of rotation of the cam plate 8, the notch 8c of the cam plate is engaged by dog or key 25 of cam plate locking member 21. Release plate 1 on, its said upward (restored) movement, opens the switch 61–62, all parts returning to the initial (FIG. 1) position.

Applicant claims the benefit of the filing date under the International Convention, of the corresponding Japanese application No. 22,102/1966 filed Apr. 9, 1966.

While the foregoing disclosure of exemplary embodiments is made in accordance with the patent statutes, it is to be understood that the invention is not limited hereto or thereby, the inventive scope being defined in the appended claims.

What is claimed is:
1. Apparatus for translating light intensity into a mechanical displacement, comprising:
   (a) a self-energized exposure control circuit comprising a control portion, and further comprising an RC portion, said RC portion comprising a photoconductive element for charging its capacitator in proportion to the light incident onto said photoconductive element;
   (b) a release plate for actuating the control portion of said exposure control circuit;
   (c) a mechanically displaceable exposure control member for providing an indication of the intensity of the light incident on said photoconductive element;
   (d) a governor mechanically linked to said exposure control member for displacing said member and for regulating the rate of its displacement;
   (e) an electromechanical actuator responsive to the control portion of said circuit;
   (f) a mechanical release mechanism responsive to said electromechanical actuator for;
      (1) actuating said governor and
      (2) actuating the RC portion of said circuit;
   (A) whereby on activation of said release plate the control portion of said circuit is mechanically actuated for energizing said electromechanical actuator;
   (B) whereby said release mechanism is actuated for
      (1) mechanically actuating said governor, and
      (2) simultaneously energizing the RC portion of circuit;
   (C) whereby
      (1) said exposure control member is mechanically displaced at a predetermined rate, and
      (2) simultaneously said capacitor is charged at a rate and to a level proportional to the intensity of light incident on said photoconductive element.
   (D) whereby upon th capacitator's discharge voltage being reached the control portion of said circuit is rendered nonconductive thereby deactuating said electromechanical actuator;
   (E) whereby said release machanism is deactuated for
      (1) deactivating sad governor and thereby stopping said exposure control member;
   (F) whereby the displacement of said member is indicative of the intensity of light incident on said photoconductive element.

2. Apparatus in accordance with claim 1 wherein said exposure control member is a rotatable member, the rotation of said member constituting said displacement.

3. Apparatus in accordance with claim 2 wherein rotation of said member effects translational movement of a lever mechanically linked to said member.

4. Apparatus in accordance with claim 2 including a spring biased set lever engageable with said rotatable member to set said member to an initial configuration and a locking member engageable with said rotatable member to retain it in said initial configuration, said mechanical release mechanism being operable to disengage said set lever and said locking members from said rotatable member.

5. Apparatus in accordance with claim 4, wherein said release mechanism includes an intermediate member disengaging the said locking member and rendering said RC portion of said circuit operative only after said set lever and said locking member are disengaged from said rotatable member.

6. Apparatus in accordance with claim 5, wherein said governor includes a spring powered gear train, said spring being energized for powering said overnor by movement of said rotatable member to said initial configuration.

References Cited

UNITED STATES PATENTS

| 2,996,965 | 8/1961 | La Rue, Jr. et al. | 352—141X |
| 3,051,065 | 8/1962 | Kobayashi | 95—10C |
| 3,059,555 | 10/1962 | Krömer et al. | 95—10C |
| 3,205,797 | 9/1965 | Land et al. | 95—10C |
| 3,241,471 | 3/1966 | Burgarella | 95—10CX |
| 3,303,766 | 2/1967 | Kirikawa et al. | 95—10C |
| 3,324,779 | 6/1967 | Nobusawa et al. | 95—10CX |
| 3,336,850 | 8/1967 | Otani et al. | 95—10C |
| 3,362,309 | 1/1968 | Cooper, Jr., et al. | 95—10C |
| 3,373,672 | 3/1968 | Ichijo et al. | 95—63 |

RONALD L. WIBERT, Primary Examiner

R. J. WEBSTER, Assistant Examiner

U.S. Cl. X.R.

95—10, 53, 63; 250—206